(12) United States Patent
Dirker et al.

(10) Patent No.: US 7,841,324 B2
(45) Date of Patent: Nov. 30, 2010

(54) BREATHING FOR AN INTERNAL COMBUSTION ENGINE

(75) Inventors: Martin W. Dirker, Bourne (GB); James D. Wotherspoon, Stamford (GB)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 12/292,789

(22) Filed: Nov. 26, 2008

(65) Prior Publication Data
US 2009/0145410 A1 Jun. 11, 2009

(30) Foreign Application Priority Data
Nov. 29, 2007 (EP) .................................. 07121898

(51) Int. Cl.
*F02B 47/10* (2006.01)
*F02M 25/07* (2006.01)

(52) U.S. Cl. ................................. 123/568.13; 123/58.8
(58) Field of Classification Search ................. 123/58.8, 123/568.13
See application file for complete search history.

(56) References Cited

U.S. PATENT DOCUMENTS

| | | | | |
|---|---|---|---|---|
| 4,271,810 A * | 6/1981 | Lancaster | ............... | 123/275 |
| 4,506,633 A * | 3/1985 | Britsch | ............... | 123/58.8 |
| 5,072,700 A | 12/1991 | Kawamura | | |
| 5,203,310 A * | 4/1993 | Gatellier | ............... | 123/568.13 |
| 5,351,668 A * | 10/1994 | Gatellier | ............... | 123/568.13 |
| 6,102,014 A * | 8/2000 | Donaldson | ............... | 123/568.12 |
| 6,178,933 B1 * | 1/2001 | Lavy | ............... | 123/58.8 |
| 6,328,003 B1 * | 12/2001 | Gaertner et al. | ............... | 123/58.8 |
| 6,425,381 B1 * | 7/2002 | Rammer | ............... | 123/568.12 |
| 6,427,644 B1 * | 8/2002 | Dabadie et al. | ............... | 123/58.8 |
| 6,431,128 B1 * | 8/2002 | Dabadie | ............... | 123/58.8 |
| 6,478,017 B2 * | 11/2002 | Bianchi | ............... | 123/568.12 |
| 6,769,393 B2 * | 8/2004 | Widener et al. | ............... | 123/316 |
| 6,932,062 B2 * | 8/2005 | Kuzuyama et al. | ............... | 123/568.13 |
| 6,941,905 B2 * | 9/2005 | Hitomi et al. | ............... | 123/58.8 |
| 7,028,648 B2 * | 4/2006 | Hasegawa et al. | ............... | 123/58.8 |
| 7,096,833 B2 * | 8/2006 | Hitomi et al. | ............... | 123/58.8 |
| 2003/0136387 A1 | 7/2003 | Arnell | | |
| 2004/0094117 A1 | 5/2004 | Widener | | |

FOREIGN PATENT DOCUMENTS

EP    1 416 128 A1    5/2004

OTHER PUBLICATIONS

European Search Report and European Search Opinion included in an EPO communication dated Jul. 3, 2008, in corresponding EP Application No. 07121898.6 (5 pages).

* cited by examiner

*Primary Examiner*—Hai H Huynh
(74) *Attorney, Agent, or Firm*—Finnegan, Henderson, Farabow, Garrett & Dunner LLC (57) ABSTRACT

In one aspect of the disclosure an internal combustion engine may be provided that may include a combustion chamber and a piston reciprocally moveable in the combustion chamber. The combustion chamber may have an intake port and a dual function port. The dual function port may be connected to an exhaust system and to an intake system. A method may be provided including opening a fluid connection between the intake system and the combustion chamber via the intake port as well as the dual function port during at least a part of an intake stroke of the piston. Instead of, or in addition, the method may include opening a fluid connection between the exhaust system and the combustion chamber via the dual function port during at least a part of the intake stroke of the piston.

25 Claims, 8 Drawing Sheets

BREATHING FOR AN INTERNAL COMBUSTION ENGINE

TECHNICAL FIELD

This disclosure relates to an internal combustion engine and, more particularly, to improved breathing for an internal combustion engine.

BACKGROUND

The operation of an internal combustion engine, such as, for example, a diesel, gasoline, or natural gas engine, may cause the generation of undesirable emissions. EP-1 416 128 discloses a possible solution for reducing undesirable emissions.

Known internal combustion engines of the four stroke type, typically may have at least one combustion chamber in which a piston is reciprocally moveable. The piston may be driveably connected to a crankshaft via a connecting rod. One end of the combustion chamber may have at least one intake port and an associated intake valve and at least one exhaust port with an associated exhaust valve. Generally, the intake and exhaust ports are provided in a cylinder head. A four stroke internal combustion engine may have an intake stroke in which the intake valve may open an intake port and the combustion chamber may be brought into fluid connection with an air intake system. During the intake stroke, the piston in the combustion chamber may move away from the cylinder head and thus, fresh combustion air may be sucked into the combustion chamber. Subsequently, the piston reverses its direction and moves towards the cylinder head for making a compression stroke.

During the compression stroke the intake valve and the exhaust valve may be closed. At a certain moment during the compression stroke fuel may be injected into the combustion chamber. Next, the fuel/air-mixture in the combustion chamber combusts and the piston motion is reversed and the power stroke takes place. During this power stroke, the combustion energy produced may be converted into kinetic energy of increased piston movement which is transferred to rotation of the crankshaft. After the power stroke, the piston movement reverses its direction and moves towards the cylinder head for making an exhaust stroke. During the exhaust stroke, normally, the intake valves are closed and the exhaust valves are opened.

Several variations to the above basic principle are known, for example, for reducing the generation of undesirable emissions. These emissions, that may include particulates and nitrous oxide (NOx), may be generated when fuel is combusted in the combustion chambers of the engine. An exhaust stroke of an engine piston forces exhaust gas, that may include these emissions, from the engine. If no emission reduction measures are in place, these undesirable emissions may eventually be exhausted to the environment.

Research is currently being directed towards decreasing the amount of undesirable emissions that may be exhausted to the environment during the operation of an engine. It is expected that improved engine design and improved control over engine operation may lead to a reduction in the generation of undesirable emissions. Many different approaches, such as, for example, exhaust gas recirculation, have been found to reduce the amount of emissions generated during the operation of an engine. Unfortunately, the implementation of these emission reduction approaches typically may result in a decrease in the overall efficiency of the engine.

Additional efforts are being focused on improving engine efficiency to compensate for the efficiency loss due to the emission reduction systems. One such approach to improving the engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine may be held open during a portion of the compression stroke of the piston. It also is known to open the intake valves for some time during the exhaust stroke. Thus, some exhaust gas will enter the air intake system and during the intake stroke re-enter the combustion chamber. This operation is known as in cylinder charge dilution (ICCD) and results in less oxygen being present in the combustion chamber for combustion. Additionally, remaining hydrocarbons in the exhaust gases may be burned after re-entrance in the combustion chamber, thus reducing undesirable emissions.

Under heavy load circumstances, it may be necessary to increase the amount of oxygen into the combustion chamber. Especially with long stroke engines, that have a rather large combustion chamber volume in relation to the diameter of the combustion chamber, during heavy load circumstances the amount of air which can be taken in may be too small. In order to be able increase the possible amount of oxygen as much as possible, the prior art has disclosed multi port engines. Such engines may have two or three intake valves and two or three exhaust valves in each combustion chamber. Of course, there is a limit to this in that the bore area of the cylindrical combustion chamber is limited and must contain both the intake ports and exhaust ports. Research has been directed to turbocharging the intake air, to the shaping of the ports and to the timing of the opening of the intake valves and exhaust valves. Although this research may have led to increase the amount of intake air that can be taken in during the intake stroke, a still further increase would be desirable.

The current disclosure is directed to one or more improvements in the existing technology.

SUMMARY

In one aspect of the disclosure an internal combustion engine may be provided that may include at least one combustion chamber and a piston reciprocally moveable in the combustion chamber. The at least one combustion chamber may have an intake port and a dual function port. The intake port may have an associated intake valve that may close off and open the intake port in the combustion chamber. The dual function port may have an associated dual function valve that may close off and open the dual function port in the combustion chamber. An intake channel forming part of an intake system may be in fluid connection with the combustion chamber via the intake port. An exhaust channel forming part of an exhaust system may be in fluid connection with the combustion chamber via the dual function port. A connecting channel may have a connecting channel inlet that may be in fluid connection with the intake system and may have a connecting channel outlet that may be in fluid connection with the combustion chamber via the dual function port. A connecting valve may be provided that, in a first position, may close off the fluid connection between the intake system and the combustion chamber via the dual function port, and that, in a second position, may open the fluid connection between the intake system and the combustion chamber via the dual function port.

In another aspect of the disclosure a method may be provided for operating an internal combustion engine. The internal combustion engine may include a combustion chamber and a piston that is reciprocally moveable in the combustion chamber. The combustion chamber may have an intake port and a dual function port. The intake port may have an associated intake port valve and the dual function port may have an associated dual function port valve. The engine may have an intake system that may be brought in fluid connection with the combustion chamber by opening the intake port valve. The engine may have an exhaust system that may be brought fluid connection with the combustion chamber by opening the dual function port valve. The method may include opening a fluid connection between the intake system and the combustion chamber via the intake port as well as the dual function port during at least a part of an intake stroke of the piston. By doing that a flow of intake gas may be provided from the intake system both through the intake port and the dual function port to the combustion chamber during at least a part of the intake stroke of the piston and an increased intake area for intake air may be provided. Instead of, or in addition to opening a fluid connection between the intake system and the combustion chamber via the intake port as well as the dual function port during an at least a part of the intake stroke of the piston, the method may include opening a fluid connection between the exhaust system and the combustion chamber via the dual function port during at least a part of the intake stroke of the piston. Thus, in cylinder charge dilution may be obtained, possibly in combination with an increased intake area for intake air.

DETAILED DESCRIPTION

Figure 1:
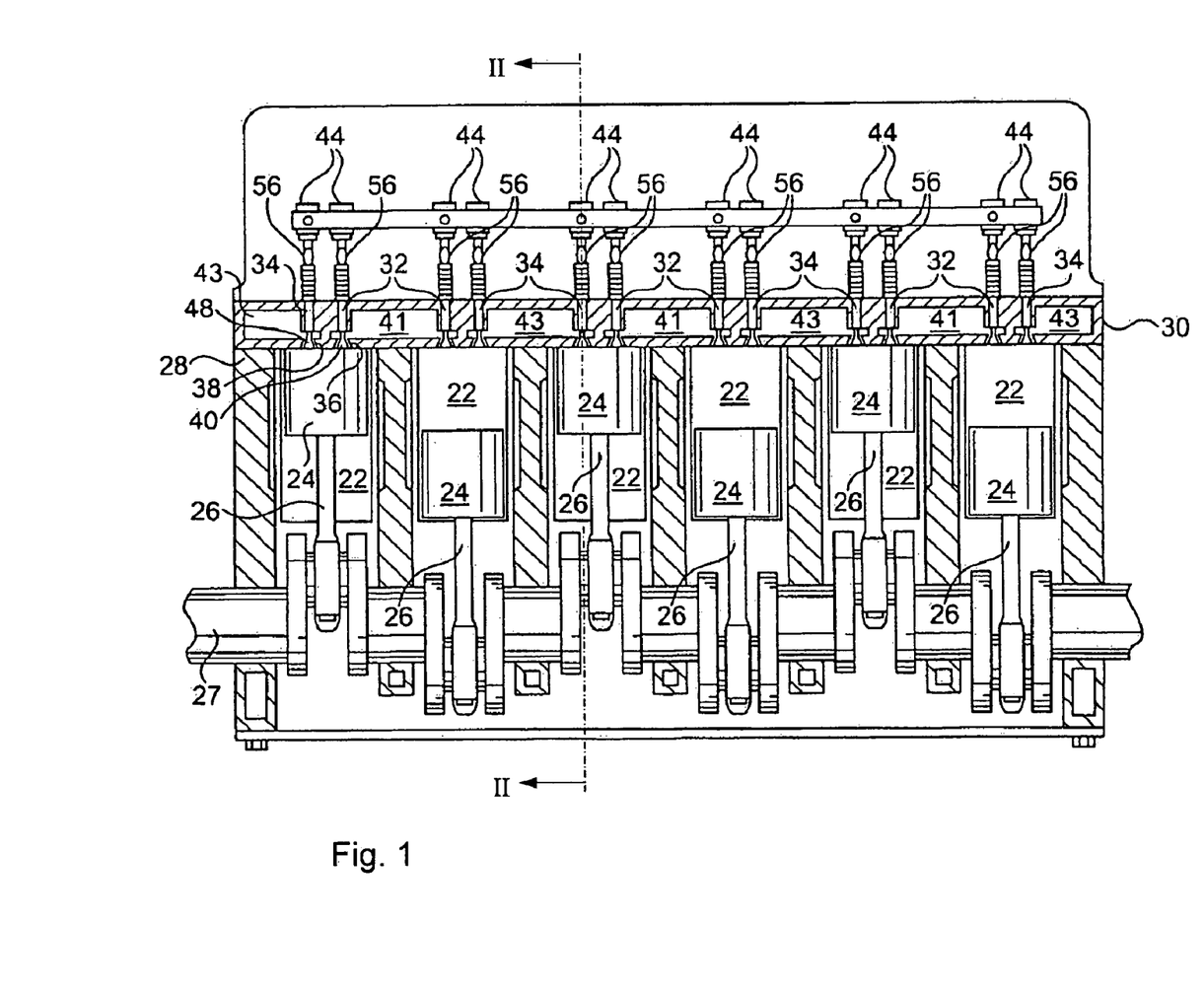
FIG. 1 is a schematic cross-sectional view of an exemplary embodiment of an internal combustion engine.

An exemplary embodiment of an internal combustion engine 20 is illustrated in FIG. 1. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 1, engine 20 may include an engine block 28 that may define a plurality of combustion chambers 22. A piston 24 may be slidably disposed within each combustion chamber 22. In the illustrated embodiment, engine 20 includes six combustion chambers 22 and six associated pistons 24. One skilled in the art will readily recognize that engine 20 may include a greater or lesser number of pistons 24 and that pistons 24 may be disposed in an "in-line" configuration, a "V" configuration, or any other conventional configuration.

As also shown in FIG. 1, engine 20 may include a crankshaft 27 that may be rotatably disposed within engine block 28. A connecting rod 26 may connect each piston 24 to crankshaft 27. Each piston 24 may be coupled to crankshaft 27 such that a sliding motion of piston 24 within the respective combustion chamber 22 may result in a rotation of crankshaft 27. Similarly, a rotation of crankshaft 27 may result in a sliding motion of piston 24.

Engine 20 may also include a cylinder head 30. Cylinder head 30 may define an intake channel 41 forming part of an intake system that may lead to at least one intake port 36 for each combustion chamber 22. Cylinder head 30 may further define two or more intake ports 36 for each combustion chamber 22.

An intake valve 32 may be disposed within each intake port 36. Intake valve 32 may include a valve element 40 that may be configured to selectively close intake port 36. As described in greater detail below, each intake valve 32 may be actuated to move or "lift" valve element 40 to thereby open the respective intake port 36. In a combustion chamber 22 having a pair of or multiple intake ports 36 and a pair of or multiple intake valves 32, the pair of or multiple intake valves 32 may be actuated by a single valve actuation assembly or by a pair of or multiple valve actuation assemblies.

Cylinder head 30 may also define at least one dual function port 38 for each combustion chamber 22. Each dual function port 38 may lead from the respective combustion chamber 22 to an exhaust channel 43 forming part of an exhaust system. Cylinder head 30 may further define two or more dual function ports 38 for each combustion chamber 22. Each dual function port 38 may also be in fluid connection with an outlet of a connecting channel 170, 270, 370 (as shown in FIGS. 3, 7, 8 and 9). Embodiments of cylinder head 30, 130, 230, 330 will be discussed in more detail with reference to FIGS. 3-9. An inlet of the connecting channel 170, 270, 370 may be in fluid connection with the intake system 41, 141, 241, 341. A first connecting valve 174, 274, 374 may be provided that, in a first position, the first connecting valve 174, 274, 374 may close off the fluid connection between the intake system 41, 141, 241, 341 and the combustion chamber 22, 122, 222, 322 via dual function port 38, 138, 238, 338. In a second position, the first connecting valve 174, 274, 374 may open the fluid connection between the intake system 41, 141, 241, 341 and the combustion chamber 22, 122, 222, 322 via the dual function port 38, 138, 238, 338. As stated, embodiments of the cylinder head 30, 130, 230, 330, and more particularly of the connecting channel 170, 270, 370 and the first connecting valve 174, 274, 374 will be discussed in more detail with reference to FIGS. 3-9.

A dual function port valve 34 may be disposed within each dual function port 38. Dual function port valve 34 may include a valve element 48 that may be configured to selectively close dual function port 38. As described in greater detail below, each dual function port valve 34 may be actuated to move or "lift" valve element 48 to thereby open the respective dual function port 38. In a combustion chamber 22 having a pair of dual function ports 38 and a pair of dual function valves 34, the pair of dual function valves 34 may be actuated by a single valve actuation assembly or by a pair of valve actuation assemblies. A combustion chamber 122, 222, 322 may, for example, have two intake ports 136, 236, 336, one dual function port 138, 238, 338 and one exhaust port 148,

248, 348. In a combustion chamber 22, 122, 222, 322 having a dual function port 38, 138, 238, 338 with an associated dual function port valve 34 and an exhaust port 148, 248, 348 with an associated exhaust port valve, the dual function port valve 38, 138, 238, 338 and the exhaust port valve may be actuated by a single valve actuation assembly or by a pair of valve actuation assemblies. Combustion chambers having multiple intake ports and associated multiple intake valves, multiple dual function ports and associated multiple dual function port valves, and/or multiple exhaust ports and multiple associated exhaust valves are contemplated.

Figure 2:
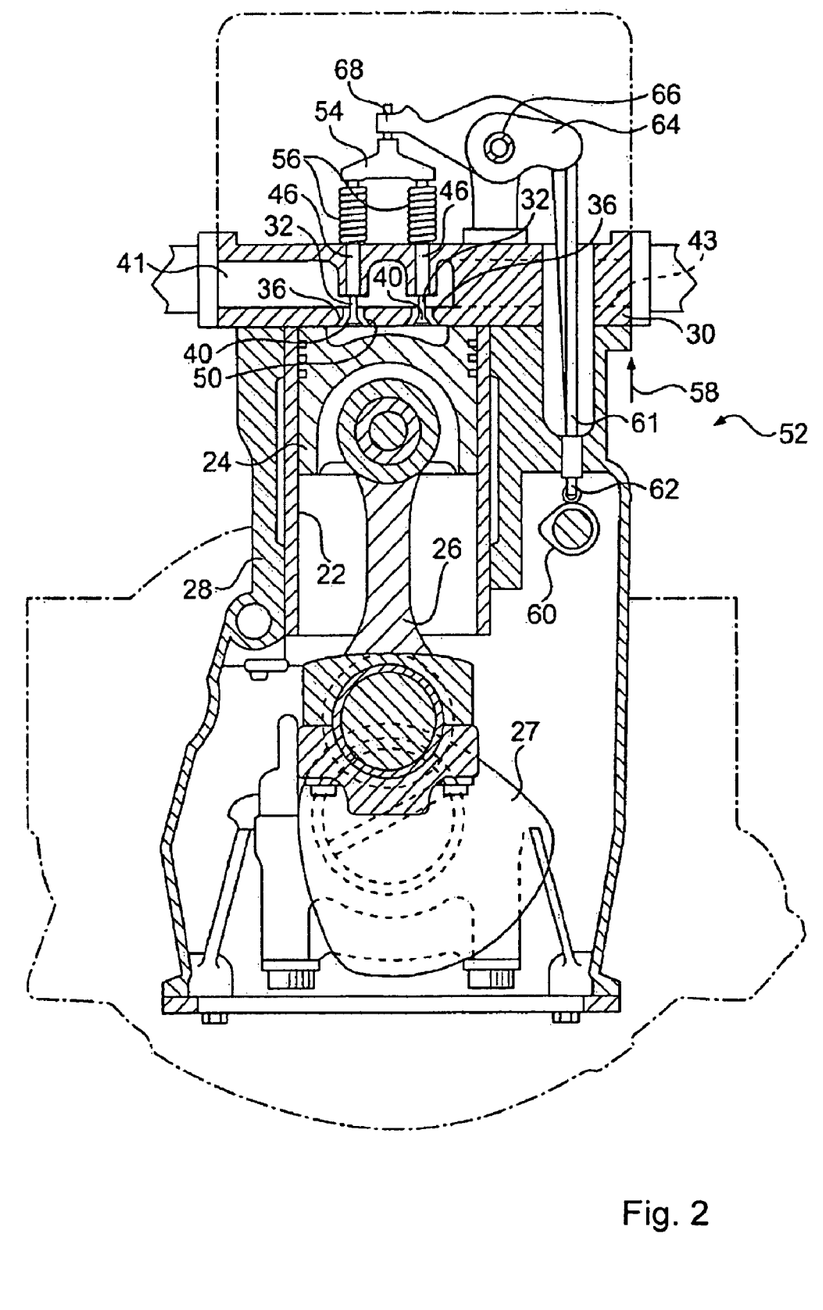
FIG. 2 is a schematic cross-sectional view over line II-II from FIG. 1.

FIG. 2 illustrates the exemplary embodiment of FIG. 1 in cross-sectional view over line 11-11 in FIG. 1. As shown, cylinder head 30 may define a pair of intake ports 36 that may connect intake channel 41 to combustion chamber 22. Each intake port 36 may include a valve seat 50. One intake valve 32 may be disposed within each intake port 36. Valve element 40 of intake valve 32 may be configured to engage valve seat 50. When intake valve 32 is in a closed position, valve element 40 may engage valve seat 50 to close intake port 36 and block fluid flow relative to combustion chamber 22. When intake valve 32 is "lifted" from the closed position, intake valve 32 may allow a flow of fluid relative to combustion chamber 22.

Similarly, cylinder head 30 may define one or more dual function ports 38 (only one of which is illustrated in FIG. 1) that may connect combustion chamber 22 with exhaust channel 43. One dual function port valve 34 may be disposed within each dual function port 38. A valve element 48 of each dual function port valve 34 may be configured to close dual function port 38 when dual function port valve 34 is in a closed position and block fluid flow relative to combustion chamber 22. When dual function port valve 34 is lifted from the closed position, dual function port valve 32 may allow a flow of fluid relative to combustion chamber 22. In addition to the at least one dual function port 38 with an associated dual function port valve 34, an exhaust port with an associated exhaust valve may be present that may connect combustion chamber 22 with exhaust channel 43. It may also be possible that no exhaust port is present and that more than one dual function port is present.

As also shown in FIG. 2, a valve actuation assembly 44 may be operatively associated with intake valves 32. Valve actuation assembly 44 may include a bridge 54 that may be connected to each valve element 40 through a pair of valve stems 46. A spring 56 may be disposed around each valve stem 46 between cylinder head 30 and bridge 54. Spring 56 may act to bias both valve elements 40 into engagement with the respective valve seat 50 to thereby close each intake port 36.

Valve actuation assembly 44 may also include a rocker arm 64. Rocker arm 64 may be configured to pivot about a pivot 66. One end 68 of rocker arm 64 may be connected to bridge 54. The opposite end of rocker arm 64 may be connected to a cam assembly 52. As shown in the embodiment of FIG. 2, cam assembly 52 may include a cam 60 having a cam lobe and mounted on a camshaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. The camshaft carrying the cam 60 may be operatively connected to crankshaft 27 so that a rotation of crankshaft 27 induces a corresponding rotation of cam 60. The camshaft may be connected to crankshaft 27 through any means readily apparent to one skilled in the art, such as, for example, through a gear reduction assembly (not shown). As one skilled in the art will recognize, a rotation of cam 60 may cause cam follower 62 and associated push rod 61 to periodically reciprocate between an upper and a lower position.

The reciprocating movement of push rod 61 may cause rocker arm 64 to pivot about pivot 66. When push rod 61 moves in the direction indicated by arrow 58, rocker arm 64 will pivot and move bridge 54 in the opposite direction. The movement of bridge 54 may cause each intake valve 32 to lift and open intake ports 36. As cam 60 continues to rotate, springs 56 will act on bridge 54 to return each intake valve 32 to the closed position.

In this manner, the shape and orientation of cam 60 may control the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is withdrawing within combustion chamber 22 to allow air to flow from intake channel 41 into combustion chamber 22.

A similar valve actuation assembly may be connected to each dual function valve and, if present, to each exhaust valve 34. A second cam (not shown) may be connected to the camshaft to control the actuation timing of dual function port valves 34 and the exhaust valves. The second cam may also be connected to another camshaft which is operatively connected with the crankshaft 27. Dual function port valves 34 may be actuated to open dual function ports 38 when piston 24 is advancing within combustion chamber 22 to allow exhaust to flow from combustion chamber 22 into the exhaust channel 43 of the exhaust system.

Figure 3:
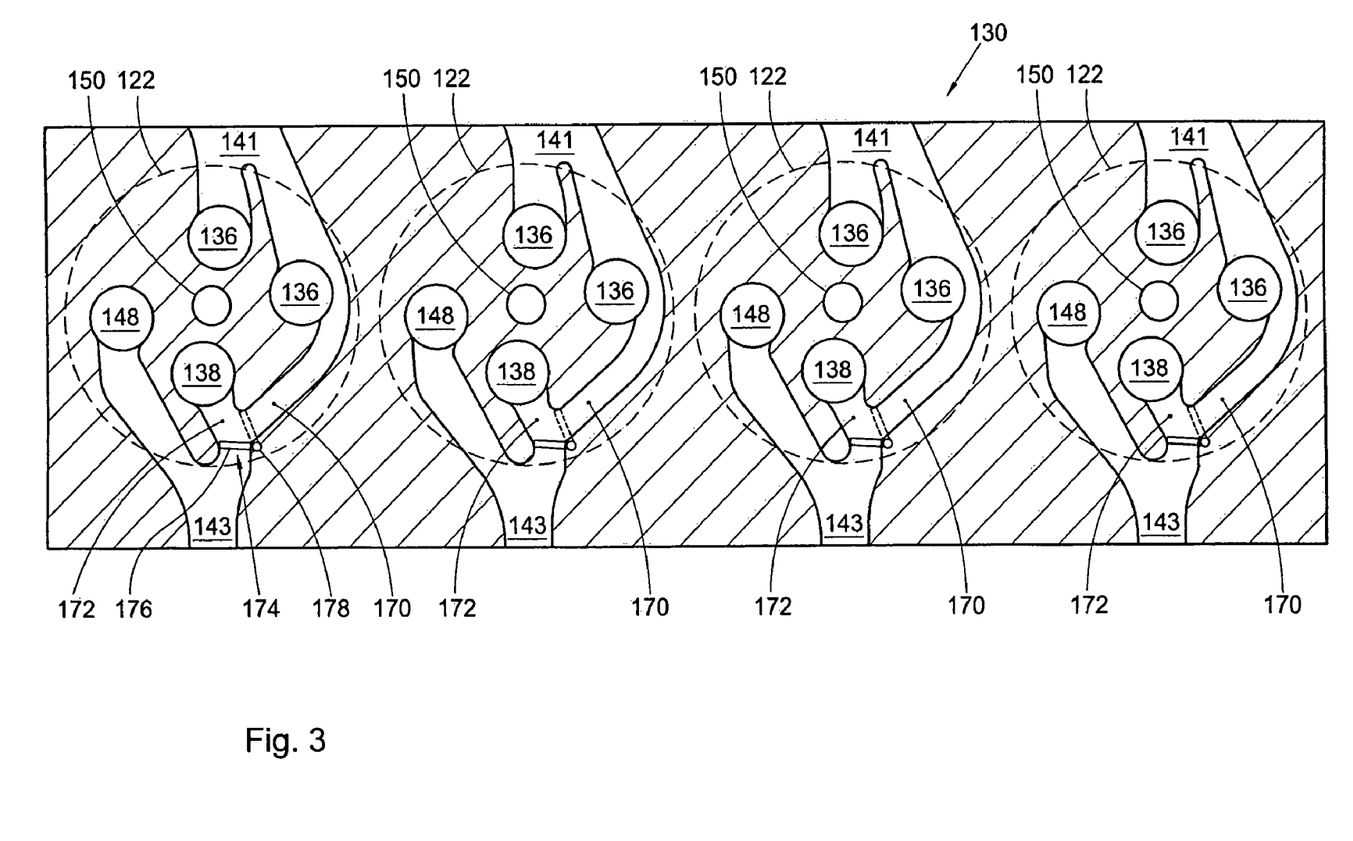
FIG. 3 is a schematic horizontal cross-sectional view of a first exemplary embodiment of a cylinder head.

Turning now to FIG. 3 in which a first exemplary embodiment of a cylinder head 130 is depicted. The cylinder head may include intake ports 136. The cylinder head may also include a dual function port 138. The cylinder head 130 may also include an exhaust port 148. Instead, the exhaust 148 port may also be replaced by another dual function port. The present embodiment of the cylinder head 130 is for a four cylinder internal combustion engine. It will be clear that any number of combustion chambers starting from one is feasible for applying the present disclosure. The cylinder head 130 may include one or more holes 150 per combustion chamber 122 for mounting a fuel injector therein.

Each intake port 136 may be in fluid connection with an intake channel 141 that may form part of an air intake system. Each exhaust port 148 may be in fluid connection with an exhaust channel 143 that may be part of the exhaust system. The cylinder head 130 may have a connecting channel 170 with which a combustion chamber 122 may be brought into fluid connection with the intake channel 141 of the intake system via dual function port 138. The cylinder head 130 may also have an exhaust channel part 172 via which the combustion chamber 122 may be brought into fluid connection with the exhaust channel 143 via the dual function port 138. Intake channels 141 may be connected to an intake manifold that may be part of the intake system. Exhaust channels 143 may be connected to an exhaust manifold that may be part of the exhaust system.

The cylinder head 130 may also include a first connecting valve 174 that, in a first position, may close off the fluid connection between the intake system and the combustion chamber 122 via the dual function port 138. The first connecting valve 174 may, in a second position, open the fluid connection between the intake system and combustion chamber 122 via the dual function port 138. The same first connecting valve 174 may also, in the first position, open the fluid connection between the exhaust system and the combustion chamber via the dual function port 138. The first connecting valve 174 may, in the second position, close off the fluid connection between the combustion chamber 122 and the exhaust system 143 via the dual function port 138. This is the case in the embodiment of FIG. 3.

For certain purposes, such as in cylinder charge dilution, an embodiment may be provided in which the first connecting valve 174 may also include intermediate positions between the first and the second positions. Thus, the combustion chamber 122 may, for example, be brought into fluid connection with both the intake system and the exhaust system during an intake stroke of a piston 24 in the combustion chamber 122.

Such a first connecting valve 174 may, for example, include a valve flap 176 that may be rotationally mounted. To that end, the valve flap 176 may be connected to a valve spindle 178. The valve will be discussed in more detail with reference to FIGS. 5 and 6.

Figure 4:
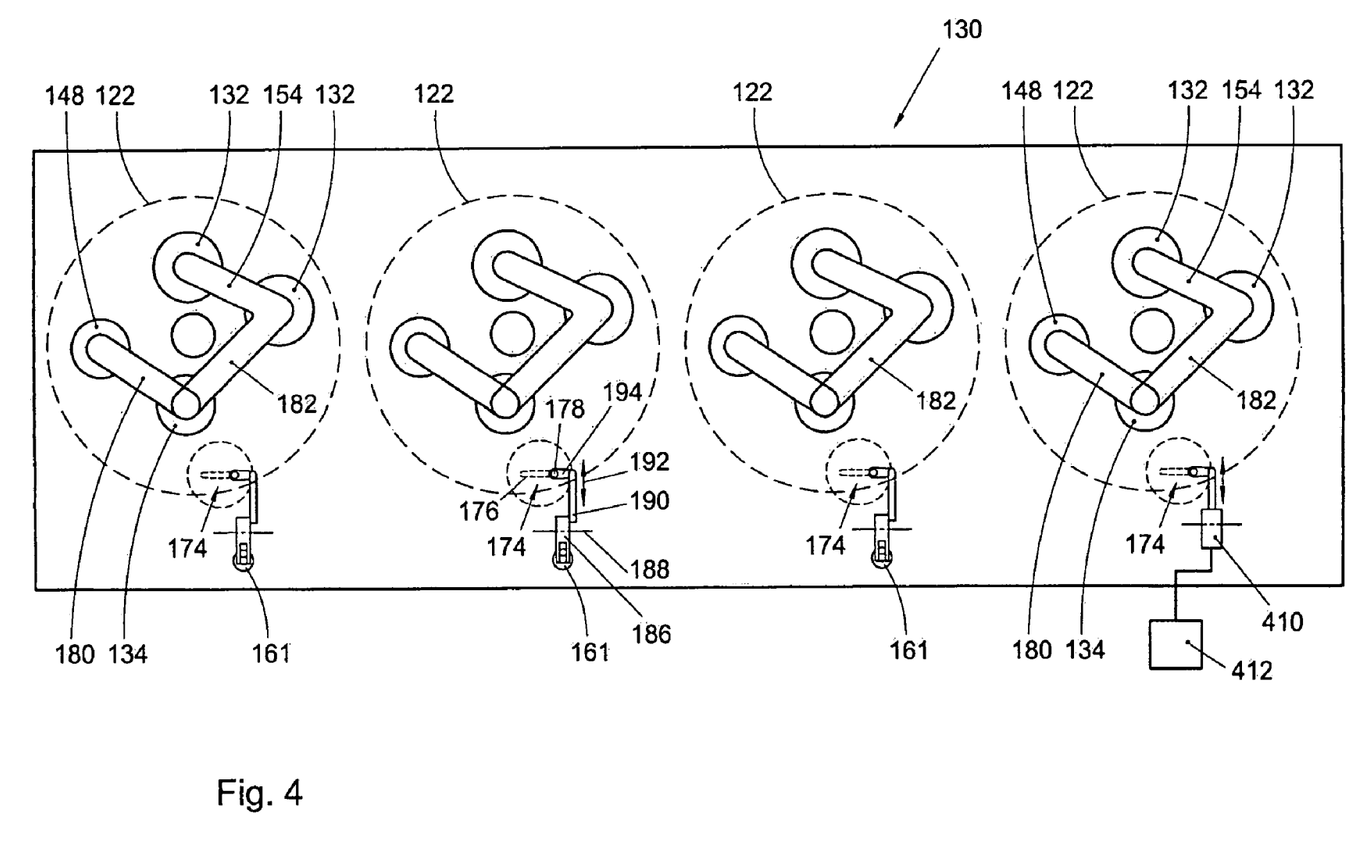
FIG. 4 is a schematic top view of the first exemplary embodiment of the cylinder head shown in FIG. 3 with some associated valve arrangements.

FIG. 4 shows a top plan view of the cylinder head 130 shown in horizontal cross-sectional view in FIG. 3. Clearly visible are bridges 154 and 180. Bridge 154 may be pushed down to open intake valves 132 associated with intake ports 136. Bridge 180 may be pushed down to open exhaust port valve 149 and dual function port valve 134. The intake port bridge 154 may have a cross bridge 182 that may be used to open dual function port valve 134 during an intake stroke of a piston. Instead, ducal function port valve 134 may also be opened by an additional actuation part 402 of the rocker arm that may actuate the intake port valves 132 for opening the dual function port valve 134 for air intake.

FIG. 4 also shows a possible embodiment of the actuation system of the first connecting valve 174. The actuation system may include a push rod 161 that may be actuated by a cam on a camshaft to move reciprocally upwardly and downwardly. A fork shaped lever 186 may be pivotal around a pivot 188. Another arm of lever 186 may be pivotally connected to a valve rod 190 which may reciprocally move in a horizontal direction as indicated by arrow 192. The valve steering rod 190 may drive valve spindle 178 via spindle lever 194 to provide the swivel action to valve flap 176.

Figure 5:
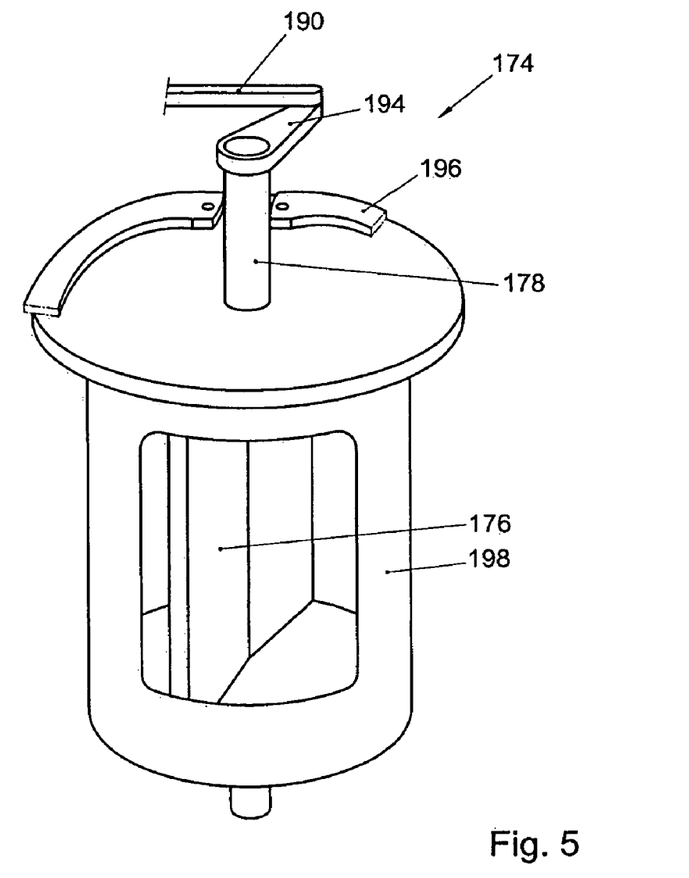
FIG. 5 is a perspective view of an exemplary embodiment of a valve which may be used in the embodiment shown in FIG. 5.
Figure 6:
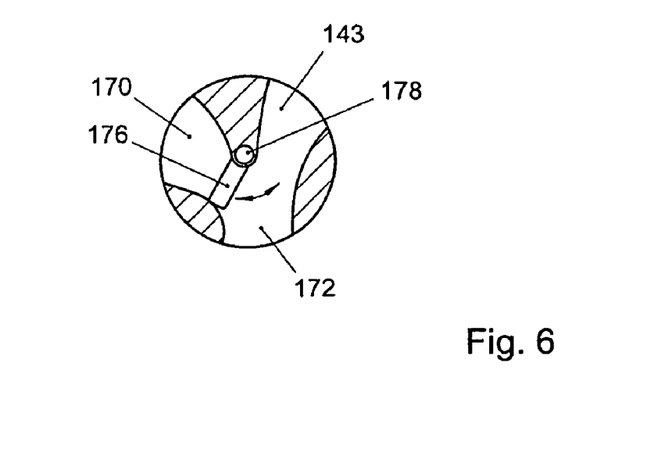
FIG. 6 is a schematic horizontal cross-sectional view of the valve shown in FIG. 6.

FIG. 5 shows an embodiment of a valve 174 that may be incorporated into cylinder head 130. FIG. 6 shows a horizontal cross-sectional view of the valve shown in FIG. 5. The embodiment may have a cylindrical housing 198 that may include a part of connecting channel 170, an upstream part 172 of exhaust channel 143 and a downstream part of exhaust channel 143. In the crossing formed by these channel parts, a valve flap 176 may be mounted. The valve flap 176 may be swiveled by valve spindle 178. Connected to valve spindle 178 may be a spindle lever 194 which may be connected to valve steering rod 190 which has been discussed before. The valve may include clips 196 with which the valve may be readily mounted into the cylinder head 130. It will be clear that a multitude of variations of valves are possible, including rotating valves, instead of swivel valves, and poppet valves.

Figure 7:
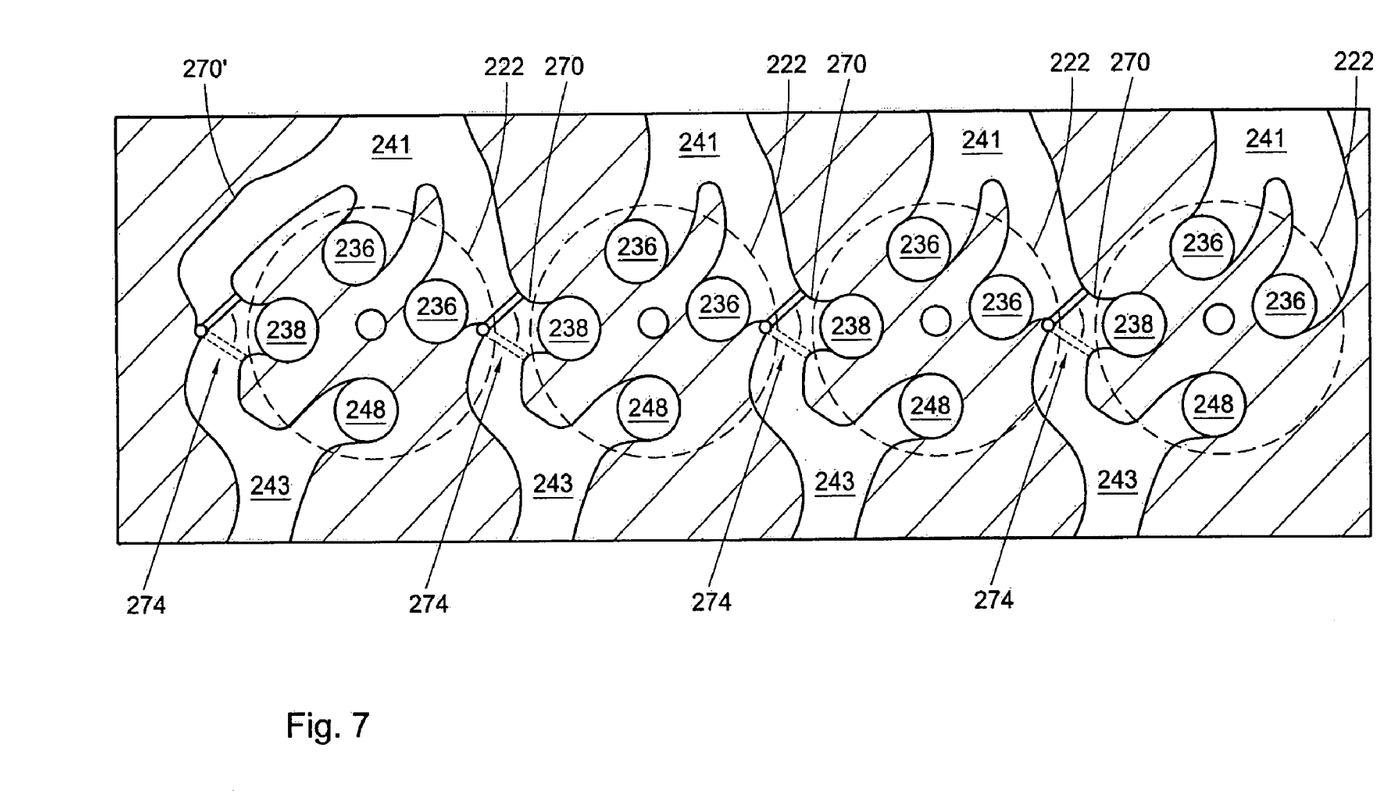
FIG. 7 is a schematic horizontal cross-sectional view of a second exemplary embodiment of a cylinder head.

FIG. 7 shows an alternative embodiment of a cylinder head 230. Per combustion chamber two intake ports 236 may be provided. Further, each combustion chamber 222 may include a dual function port 238. In the present embodiment, each combustion chamber also includes an exhaust port 248. However, exhaust port 248 may also be omitted. Instead thereof, these ports may also have a dual function in that they may be brought into fluid connection with an intake system during an intake stroke. In the present embodiment the dual function ports 238 of the three combustion chambers 222 on the right in FIG. 7 may be connected to an intake channel 241 of a neighboring combustion chamber 222 via connecting channel 270. The dual function port 238 of the left hand combustion chamber 222 may be connected to intake system channel 241 belonging to that combustion chamber via connecting channel 270'. As in the embodiment of FIG. 3 a first connecting valve 274 may be provided. That connecting valve 274 may have the same structure as the valve described with reference to FIGS. 3-6.

Figure 8:
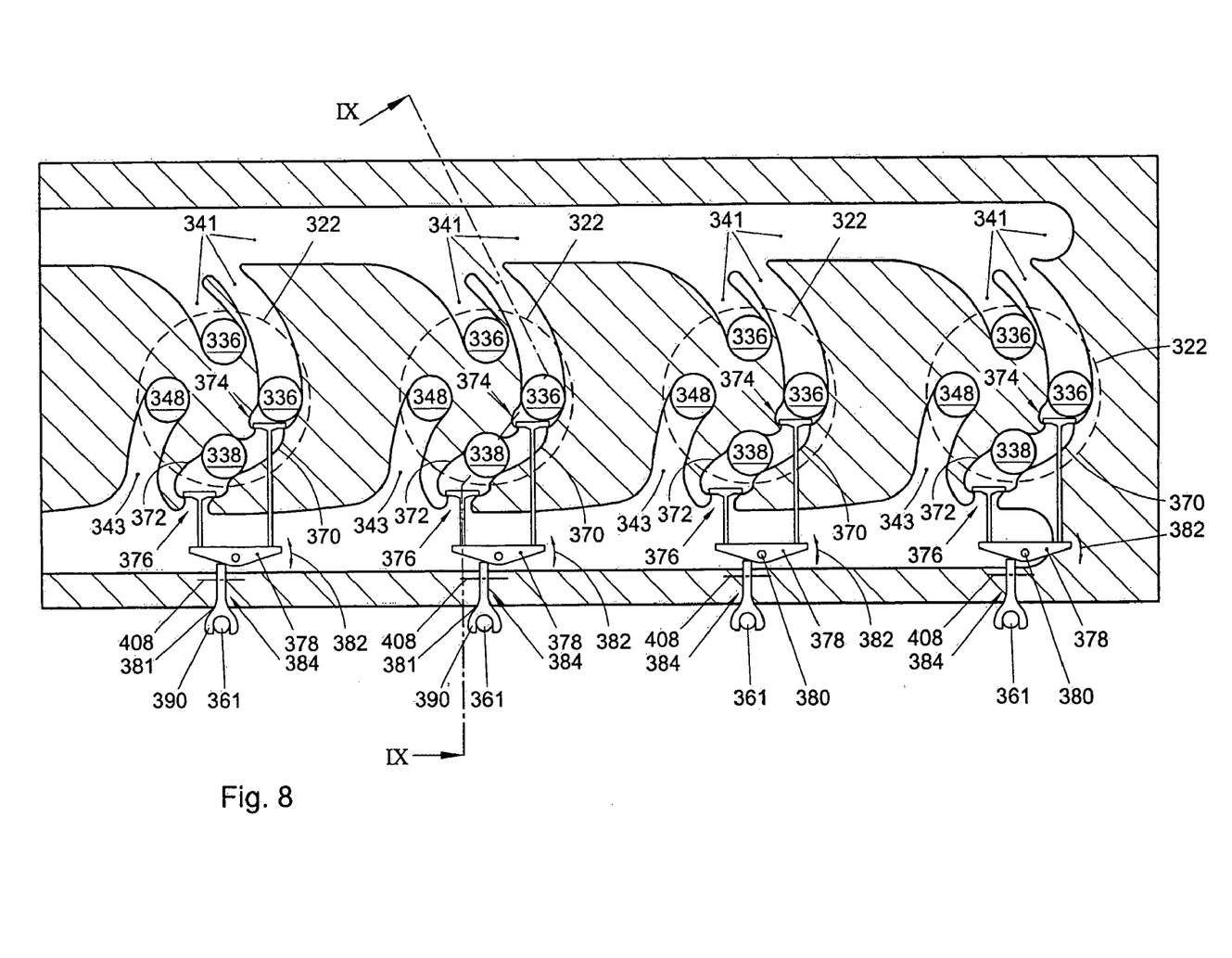
FIG. 8 is a schematic horizontal cross-sectional view of a third exemplary embodiment of a cylinder head with some associated valve arrangements.

FIG. 8 shows a third embodiment of a cylinder head 330. Per combustion chamber 322 two intake ports 336 may be provided. It is clear that also one intake port 336 or more than two intake ports 336 may be present, at least, when the bore area of the combustion chamber 322 provides enough space for more than two intake ports 336. The cylinder head 330 may contain intake channels 341 which may be part of an air intake system. Each combustion chamber 322 may also include a dual function port 338 that may be connected to the exhaust system, more particular to an intermediate exhaust channel part 372 of exhaust channel 343 of the exhaust system. The dual function port 338 may also be brought into fluid connection with the air intake system via connecting channel 370.

Each combustion chamber 322 may also be provided with an exhaust port 348 which may be connected to exhaust channel 343. In the present embodiment, a first connecting valve 374 of the poppet valve type may be provided in the connecting channel 370. By opening the first connecting valve 374, the combustion chamber 322 may be brought into fluid connection with the intake channel 341 via dual function port 338. A second connecting valve 376 may be provided to bring the combustion chamber 322 into fluid connection with the exhaust system channel 343 via dual function port 338. When the first connecting valve 374 is opened, the second connecting valve 376 may be closed and visa versa.

It may also be possible to open both the first and the second connecting valve 374, 376, for example, when in cylinder charge dilution is desired. Actuation of the first valve 374 and the second valve 376 may be provided by a bridge 378 which may be pivotable around a pivot 380. The pivot motion indicated by arrow 382 may be activated by a lever 384 that may include two arms 386 and 388 and may be pivotable around pivot 408. The end of the first arm 386 may be provided with a fork 390 that may engage push rod 361. The other arm 388 may engage bridge 378 at one side of the pivot 380. The up- and downwardly reciprocating movement of push rod 361, may be actuated by a cam 360 on a camshaft 400. The camshaft 400 may rotate in synchronism with the crank shaft 27.

Figure 9:
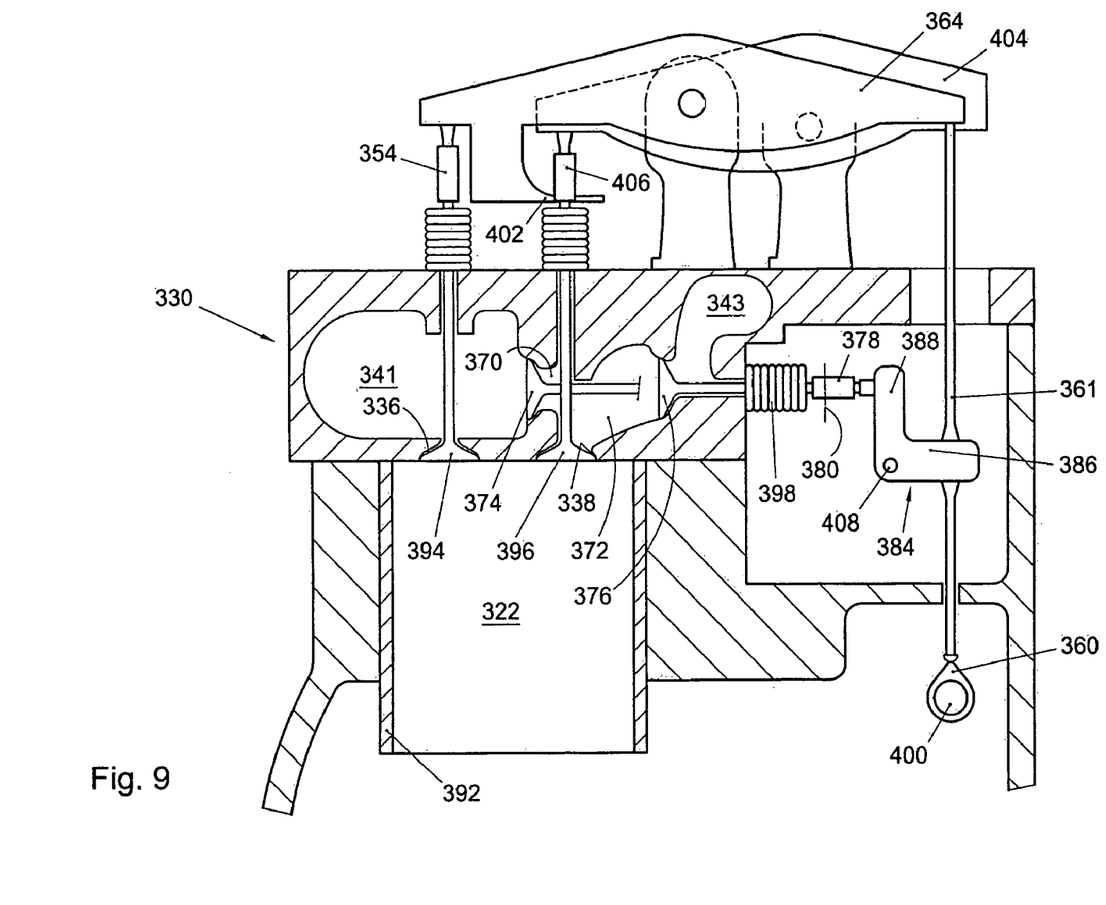
FIG. 9 is a schematic cross-sectional view over line, IX-IX in FIG. 8.

FIG. 9 shows across sectional view over line IX-IX in FIG. 8. Clearly visible is, a number of parts which already have been described with reference to FIG. 8 and which are indicated with the same reference numbers in FIG. 9. In addition to what has been described with reference to FIG. 8, FIG. 9 clarifies the following. As can been seen intake port 336 may be shut of by an intake valve 394. Dual function port 338 may be closed by dual function port valve 396. The exhaust ports 348 may also have such associated exhaust valves. The first connecting valve 374 and the second connecting valve 376 are clearly visible. Also visible is push rod 361 which may operate lever 384 with the fork shaped first arm 386 and the second arm 388. The second arm 388 may be operatively connected with bridge 378 which may be pivotable around pivot 380. A spring 398 may be present to keep the second connecting valve 376 in a closed position when it is, not actuated by bridge 378. A similar spring may be present to keep the first connecting valve 374 in a closed position unless it is actuated by bridge 378. The push rod 361 may be actuated by a cam 360 which may be mounted on a camshaft 400. The same push rod 361 may also actuate rocker arm 364. Rocker arm 364 may actuate bridge 354 for opening intake valves 394 of intake ports 336. Rocker arm 364 may also be provided with an additional actuator part 402 that may open dual function port valve 396 when the left hand end off rocker arm 364 moves downwardly. A second rocker arm 404 may be provided that may actuate bridge 406 for opening both the dual function port valve 396 and a valve associated with exhaust port 348. The rocker arm 404 may be actuated by another push rod (not shown) which, in turn may be actuated by another cam (not shown) on camshaft 400.

Instead of the mechanical actuation system shown in the embodiments described, numerous other actuation systems of may be possible. The first connecting valve 174, 274, 374 may be operated by a first actuator assembly which may be chosen from the group including a mechanical actuator assembly, a hydraulic actuator assembly, an electro-mechanical actuator assembly and a pneumatic actuator assembly. The second connecting valve 374 may also be actuated by a second actuator assembly which may be chosen from the group including a mechanical actuator assembly, a hydraulic actuator assembly, an electro-mechanical actuator assembly and a pneumatic actuator assembly. Instead of poppet valves 374, 376, as shown in the embodiment of FIGS. 8 and 9, or swivel valves 174, 274 as shown in the embodiments of FIG. 3-7, rotary valves also may be used. Such rotary valves may also be feasible for the intake port valve 394, the dual function port valve 396 and the exhaust port valves 40. When the actuator assembly is chosen from the group including a hydraulic actuator assembly, an electro-mechanical actuator assembly and a pneumatic actuator assembly, the engine may include a controller 412 providing signals to the first actuator assembly 410 and/or the second actuator assembly for opening and closing the first connecting valve and/or the second connecting valve at desired moments. Such a variant is shown, by way of example, in the right hand combustion chamber 122 of FIG. 4. The first connecting valve 174 may be actuated by a hydraulic, pneumatic and/or electro-mechanic actuator 410 which may be controlled by controller 410. The controller 412 may provide signals to the actuator assembly 410 for opening and closing the first connecting valve 174 at desired moments. It will be clear that a similar actuation assembly and control may be provided for a second connecting valve, such as second connecting valve 376.

INDUSTRIAL APPLICABILITY

The improved breathing of the internal combustion engine as described may be applied in any internal combustion engine. With the provision of a dual function port having an associated dual function valve for closing off and opening the dual function port as well as the provision of a connecting channel with which the dual function port may be connected to an intake system, an improved breathing of the internal combustion engine may be obtained during intake. During exhaust, the dual function port may be connected to an exhaust systems that may include an exhaust channel in the cylinder head. At the same time, during an exhaust stroke of the piston, the fluid connection between the intake system and the intake port as well as the dual function port may be closed off. Thus, the dual function port may be used for both intake and exhaust and an exhaust gas may flow through the exhaust port and dual function port during the exhaust gas stroke of the piston.

The first connecting valve 174, 274, 374 may, in a first position close off the fluid connection between the combustion chamber 122, 222, 322 and the intake system 141, 241, 341 via the dual function port 138, 238, 338. The first connecting valve may, in a second position, open the fluid connection between the combustion chamber 122, 222, 322 and the intake system 141, 241, 341 via the dual function port 138, 238, 338. The same first connecting valve 174, 274 may also be used for opening and closing the fluid connection between the combustion chamber 122, 222 and the exhaust system 141, 241 via the dual function port 138, 238. However, as explained before, a separate, second connecting valve 376 also may be provided for that purpose.

By providing a fluid connection between the intake system 141, 241, 341 and the combustion chamber 122, 222, 322, via the intake port 136, 236, 336 as well as the dual function port 138, 238, 338 during an intake stroke of the piston, a larger intake area for the intake air may be provided than in conventional internal combustion engines. Further, by opening the fluid connection between the dual function port 138, 238, 338 and the exhaust system 143, 243, 343 during an exhaust stroke of the piston 24, an exhaust gas flow through the dual function port 138, 238, 338 and any exhaust ports 148, 248, 348 may be provided. Thus both during intake as well as during exhaust a large intake area and a large exhaust area are provided. This may increase the available power of an engine. Especially with so-called long stroke engines, in which the length of the combustion chamber is large relative to the diameter, a better intake of combustion air may be provided during heavy load.

As explained above, in a first control strategy of the valves, during an intake stroke, the intake valves 132 of the intake ports 136 and the dual function port valve 134 of a dual function port 138 may be opened and at the same time and the first connecting valve 174, 274, 370 may be in such a position that the combustion chamber 122, 222, 322 is in fluid connection with the intake system via the dual function port 138, 238, 338 while the first connecting valve 174, 274 or, if present, the second connecting valve 376 may be in such a position that no fluid connection is present between the exhaust system and the combustion chamber 122, 222, 322 via dual function port 138, 238, 338. Thus, an increased intake area for intake air may be obtained.

In another control strategy of the valves, it may also be that the first connecting valve 174, 274 is in a position such that, during at least a part of the intake stroke, the combustion chamber 122, 222 is in fluid connection with both the intake system and the exhaust system. Such a situation may be achieved by positioning the first connecting valve 174, 274 in an intermediate position such that the dual function port 138, 238 may receive both intake air from the intake system and exhaust air from the exhaust system. Such a situation may alternatively be achieved by positioning the first connecting valve 174, 274 in the second position and opening dual function port valve 134 during at least a part of the intake stroke. Accordingly, during the intake stroke of piston 24, intake air will enter the combustion chamber via intake ports 136 and exhaust gas may enter the combustion chamber 122, 222 via dual function port 138. Thus, in cylinder charge dilution may be obtained in combination with an increased intake area for intake air.

When two connecting valves 374, 376 are present, both connecting valves 374, 376 may be opened or at least the second connecting valve 376 may be opened. When both connecting valves 374, 376 are opened dual function port 338 may introduce both intake air and exhaust gas into combustion chamber 322 during at least a part of the intake stroke. Thus, in cylinder charge dilution may be obtained in combination with an increased intake area for intake air. When only the second connecting valve 376 is in an opened position while the first connecting valve 374 is in a closed position, intake air may enter the combustion chamber 322 via intake ports 336 and exhaust gas may enter combustion chamber 322 via dual function port 338. Thus, in cylinder charge dilution may be obtained.

It will be apparent to those having ordinary skill in the art that various modifications and variations can be made to the improved breathing provision for internal combustion engines as disclosed herein. Other embodiments will be apparent to those having ordinary skill in the art from consideration of the specification. It is intended that the specification and examples are being considered as exemplary only. Other aspects, features and advantages will be apparent upon an examination of the attached drawings and appended claims.

The invention claimed is:

1. An internal combustion engine, comprising:
    at least one combustion chamber and a piston reciprocally moveable in the combustion chamber;
    the at least one combustion chamber having an intake port and a dual function port;
    the intake port having an associated intake valve for closing off and opening the intake port in the combustion chamber;
    the dual function port having an associated dual function valve for closing off and opening the dual function port in the combustion chamber;
    an intake channel forming part of an intake system and in fluid connection with the combustion chamber via the intake port;
    an exhaust channel forming part of an exhaust system and in fluid connection with the combustion chamber via the dual function port;
    a connecting channel having a first end that is in fluid connection with the intake system and having a second end that is in fluid connection with the combustion chamber via the dual function port; and
    a first connecting valve that includes a first position that closes off the fluid connection between the intake system and the combustion chamber via the dual function port, and that includes a second position that opens the fluid connection between the intake system and the combustion chamber via the dual function port and closes off the fluid connection between the combustion chamber and the exhaust system via the dual function port.

2. The internal combustion engine according to claim 1, wherein the first connecting valve in the first position opens the fluid connection between the combustion chamber and the exhaust system via the dual function port, and wherein the first connecting valve has at least one intermediate position in which the combustion chamber is in fluid connection with both the intake system and the exhaust system.

3. The internal combustion engine according to claim 1, wherein the first connecting valve is a poppet valve.

4. The internal combustion engine according to claim 1, wherein the first connecting valve includes a valve flap that is rotationally mounted.

5. The internal combustion engine according to claim 1, including a cylinder head, the intake channel, the exhaust channel and the connecting channel extending in the cylinder head, the first connecting valve being mounted in the cylinder head.

6. The internal combustion engine according to claim 1, including a first actuator assembly for actuating the first connecting valve.

7. The internal combustion engine according to claim 6, wherein the first actuator assembly is chosen from the group consisting of a mechanical actuator assembly, a hydraulic actuator assembly, an electromechanical actuator assembly and a pneumatic actuator assembly.

8. The internal combustion engine according to claim 6, wherein the first actuator assembly is a mechanical actuator assembly including a camshaft having a cam lobe, a push rod having a cam follower, a lever operatively connected with the push rod and operatively connected with the first connecting valve.

9. The internal combustion engine according to claim 6, wherein the first actuator assembly is chosen from the group consisting of a hydraulic actuator assembly, an electromechanical actuator assembly and a pneumatic actuator assembly, the engine including a controller providing signals to the first actuator assembly for opening and closing the first connecting valve at desired moments.

10. The internal combustion engine of claim 1, wherein the first end of the connecting channel is a connecting channel inlet configured to receive fluid from the intake system and the second end of the connecting channel is a connecting channel outlet configured to supply the fluid to the combustion chamber via the dual function port.

11. An internal combustion engine, comprising:
    at least one combustion chamber and a piston reciprocally moveable in the combustion chamber;
    the at least one combustion chamber having an intake port and a dual function port;
    the intake port having an associated intake valve for closing off and opening the intake port in the combustion chamber;
    the dual function port having an associated dual function valve for closing off and opening the dual function port in the combustion chamber;
    an intake channel forming part of an intake system and in fluid connection with the combustion chamber via the intake port;
    an exhaust channel forming part of an exhaust system and in fluid connection with the combustion chamber via the dual function port;
    a connecting channel having a first end that is in fluid connection with the intake system and having a second end that is in fluid connection with the combustion chamber via the dual function port;
    a first connecting valve that includes a first position that closes off the fluid connection between the intake system and the combustion chamber via the dual function port, and that includes a second position that opens the fluid connection between the intake system and the combustion chamber via the dual function port;
    a second connecting valve that includes a first position that closes off the fluid connection between the exhaust system and the combustion chamber via the dual function port, and that includes a second position that opens the fluid connection between the exhaust system and the combustion chamber via the dual function port; and
    an actuator assembly operatively connected to both the first and second connecting valves, the actuator assembly including a bridge that is pivotable about a pivot and connected to the first and second connecting valves.

12. The internal combustion engine according to claim 11, wherein the second connecting valve is a poppet valve.

13. The internal combustion engine according to claim 11, wherein the second connecting valve includes a valve flap that is rotationally mounted.

14. The internal combustion engine according to claim 11, including a cylinder head, the intake channel, the exhaust channel and the connecting channel extending in the cylinder head, the first connecting valve and the second connecting valve being mounted in the cylinder head.

15. The internal combustion engine according to claim 11, wherein the actuator assembly is a mechanical actuator assembly including a camshaft having a cam lobe, a push rod having a cam follower, a lever operatively connected with the push rod and operatively connected with the bridge.

16. A method for operating an internal combustion engine having a combustion chamber, a piston that is reciprocally moveable in the combustion chamber, the combustion chamber having an intake port and a dual function port, the intake port having an associated intake port valve and the dual function port having an associated dual function port valve, the engine having an intake system that may be brought in fluid connection with the combustion chamber by opening the intake port valve, the engine having an exhaust system that may be brought fluid connection with the combustion chamber by opening the dual function port valve, the method comprising:

opening a fluid connection between the intake system and the combustion chamber via the intake port as well as a fluid connection between the intake system and the combustion chamber via the dual function port during at least a part of an intake stroke of the piston.

17. The method according to claim 16, including:

closing off the fluid connection between the combustion chamber and intake system via the intake port as well as via the dual function port during an exhaust stroke of the piston; and opening the fluid connection between the combustion chamber and the exhaust system via the dual function port during the exhaust stroke of the piston.

18. The method of claim 17, wherein:

opening the fluid connection between the intake system and the combustion chamber via the dual function port includes using a first connecting valve to open the fluid connection between the intake system and the combustion chamber via the dual function port; and opening the fluid connection between the combustion chamber and the exhaust system includes using a second connecting valve to open the fluid connection between the combustion chamber and the exhaust system via the dual function port.

19. The method of claim 16, further including directing fluid from the intake system to the combustion chamber through the fluid connection, the intake port, and the dual function port during the at least part of the intake stroke of the piston.

20. The method of claim 16, further including directing fluid from the combustion chamber to the exhaust system via the dual function port during at least part of an exhaust stroke of the piston.

21. The method of claim 16, further including directing fluid from the intake system and the exhaust system to the combustion chamber through the dual function port during the at least part of the intake stroke of the piston.

22. The method of claim 16, wherein a first connecting valve opens the fluid connection between the intake system and the combustion chamber via the dual function port; and the method further includes:

using the first connecting valve to close off the fluid connection between the combustion chamber and the intake system via the dual function port during an exhaust stroke of the piston.

23. A method for operating an internal combustion engine having a combustion chamber, a piston that is reciprocally moveable in the combustion chamber, the combustion chamber having an intake port and a dual function port, the intake port having an associated intake port valve and the dual function port having an associated dual function port valve, the engine having an intake system that may be brought in fluid connection with the combustion chamber by opening the intake port valve, the engine having an exhaust system that may be brought fluid connection with the combustion chamber by opening the dual function port valve, the method comprising:

opening a fluid connection between the exhaust system and the combustion chamber via the dual function port and a fluid connection between the intake system and the combustion chamber via the dual function port during at least a part of an intake stroke of the piston.

24. The method of claim 23, further including directing fluid from the intake system to the combustion chamber via the dual function port during the at least part of the intake stroke of the piston.

25. The method of claim 23, further including opening the fluid connection between the combustion chamber and the exhaust system via the dual function port during the exhaust stroke of the piston.

* * * * *